Oct. 27, 1942.   R. S. BENNETT   2,300,195
ELECTRICAL APPARATUS
Filed Sept. 12, 1941
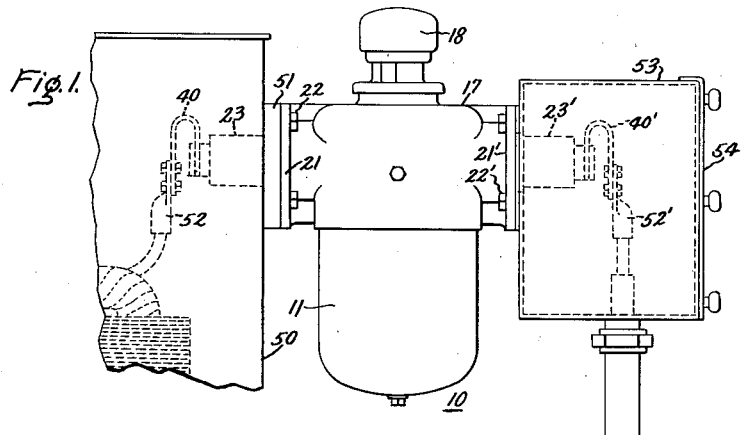
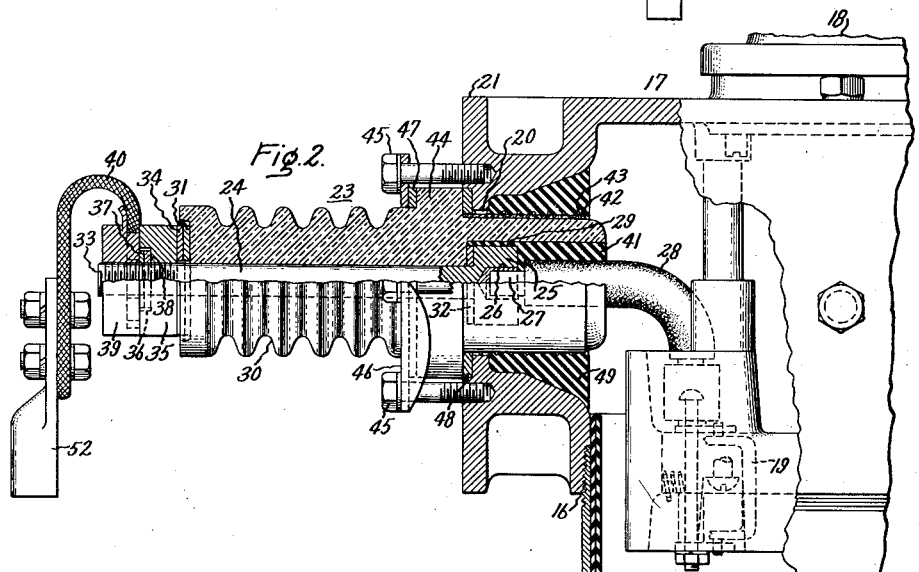
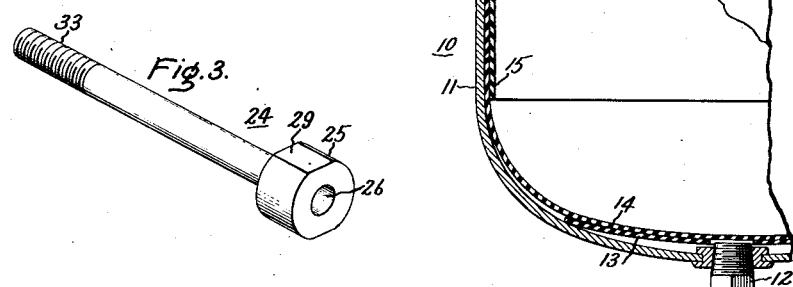
Inventor:
Ralph S. Bennett,
by Harry E. Dunham
His Attorney.

Patented Oct. 27, 1942

2,300,195

UNITED STATES PATENT OFFICE 2,300,195

ELECTRICAL APPARATUS

Ralph S. Bennett, Pittsfield, Mass., assignor to General Electric Company, a corporation of New York Application September 12, 1941, Serial No. 410,557

4 Claims. (Cl. 174—75)

My invention relates to electrical apparatus and more particularly to electrical apparatus including a circuit-interrupting device such as an electrical cutout and the mounting and connecting means therefor.

Electrical cutouts and particularly cutouts of the oil-filled type of relatively large capacity such as are disclosed and claimed in United States Letters Patent 1,195,790, 1,203,316, and 1,248,090 are often used to protect electrical apparatus and particularly to protect electric-translating apparatus, such as transformers and the like. Since cutouts of the type disclosed in the above-mentioned patents include an oil-filled casing, it is necessary to bring the leads therefrom out through the casing by means of an insulated bushing assembly or the like. Electric translating apparatus, such as transformers, are also usually filled with oil or some other suitable insulating liquid and are also provided with insulated bushing means through which electrical connections are made to the windings within the transformer casing.

I have discovered that a much more compact device greatly simplifying the electrical connections is obtained by providing the oil-filled cutout with means for supporting it on the transformer casing so as to eliminate one of the bushings and allow a single bushing to suffice for one terminal of the cutout and one terminal of the transformer. Such an arrangement greatly simplifies the installation since the transformer and cutout may be shipped assembled and, in installing the apparatus, it is necessary to complete fewer connections than in the prior art arrangements.

Accordingly, it is an object of my invention to provide a new and improved electrical apparatus including a circuit-interrupting device such as a cutout having the advantages enumerated above.

It is another object of my invention to provide a new and improved terminal for oil-filled circuit-interrupting devices which extends through the casing thereof, which will greatly reduce the cost of electrically connecting the device to the associated electric-translating apparatus and which is sufficiently strong to stand the shock of explosive pressures which might be produced within the apparatus.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which Fig. 1 thereof is a diagram of an electrical cutout embodying my invention mounted on the casing of an electric-translating apparatus, Fig. 2 is an enlarged view partly in section of one of the cutout bushing assemblies of Fig. 1, and Fig. 3 is a perspective view of a portion of the bushing assembly illustrated in Fig. 2.

Referring now to Fig. 1 of the drawing, I have illustrated an oil-filled electric cutout generally indicated at 10, which may be referred to as an auxiliary electrical apparatus since it is usually associated with a main apparatus, such as a transformer or the like, for protective purposes. Except for the terminals or bushing assemblies thereof, oil-filled electric cutout 10 may be substantially identical with the cutout disclosed and claimed in United States Letters Patent 1,248,090 referred to above. Accordingly, the details of the circuit-interrupting device or cutout 10, in so far as the circuit-interrupting features thereof are concerned, form no part of my invention and, consequently, will only be briefly described hereinafter since a detailed description thereof is available in the above-mentioned United States Letters Patent.

As shown in Figs. 1 and 2 of the drawing, cutout 10 comprises an oil-filled type of fuse including a cylindrical container or tank 11, sufficiently strong to stand the pressures generated therein under certain conditions and having a tapered plug 12 in the lower portion thereof. Tank or casing 11 is preferably provided with suitable insulating liners 13, 14, and 15. Cylindrical casing or tank 11 is also threaded at 16 so as to be readily attached to a suitable cover 17 which is preferably formed of cast iron. A removable fuse carrier 18 inserted through an opening in cover 17 is provided which may be rotated manually to make or break the electrical circuit therein at contact assemblies, such as 19, as is well understood by those skilled in the art.

In accordance with my invention, the cover 17 of oil-filled cutout 10 is provided with diametrically opposed openings 20 through which electrical connections with the circuit-interrupting unit or cutout are made. Only one of these openings is shown in Fig. 2 but it will be understood that both of these openings may be identical for an arrangement such as is shown in Fig. 1. The cover 17 is constructed so that an integral flange 21 surrounding the openings 20 is provided in order to permit mounting the cutout device as will be described in greater detail hereinafter.

Since the right-hand and left-hand flanges 21 are identical in Fig. 1, the corresponding right-hand parts of Fig. 1 will be designated by the corresponding primed reference numerals, which unprimed numerals are used to designate the identical left-hand parts of Figs. 1 and 2. The flanges 21 and 21' are adapted to be secured as by bolts 22 and 22', respectively, Fig. 1, directly to suitable apparatus as will be described hereinafter.

Due to the very high pressures resulting upon interruption of the circuit in the oil fuse cutout 10, it is necessary to provide a bushing assembly which will not only stand these pressures but which may vibrate from the shock of current interruption without damage to itself or associated apparatus. Accordingly, the left-hand bushing assembly generally designated at 23 in Figs. 1 and 2 comprises a conducting stud 24 illustrated in detail in Fig. 3 having a head 25 with a recess 26 therein into which the uninsulated end 27 of a flexible insulated cable 28 is suitably connected as by solder or the like. The other end of the flexible cable 28 is connected to the contact assembly 19 within the cutout 10. The head 25 of conducting stud 24 is provided with two flat sides 29 so that it may be engaged by means of a hollow wrench for connecting purposes. Surrounding the conducting stud 24 is an insulating sleeve 30 preferably formed of a ceramic, such as porcelain or the like. Suitable sealing and cushioning gaskets 31 and 32, respectively, are placed on conducting stud 24 to engage the respective ends of insulator 30. To secure conducting stud and insulator 30 together, the threaded end 33 of stud 24 is provided with a metallic washer 34 and a circular nut 35 having a recess 36 therein within which an ordinary washer 37 and a spring washer 38 are mounted. A second circular nut 39, which may be brazed to a flexible conductor 40 is also adapted to be threaded on stud 24 in such a manner that the spring washer 38 is completely concealed between the nuts 35 and 39. The stud is tightened by applying a wrench to the head 25 having flat sides 29 and, since nuts 35 and 39 are circular, the bushing cannot be tampered with after it has been installed to disturb the gasket joints.

In addition to the tamperproof feature provided by the use of circular nuts 35 and 39, this construction also insures good electrical connection between the outer circular nut 39 and the threaded end 33 of conducting stud 34 since the spring washer, usually constructed of spring steel which is a poor conducting material, is electrically by-passed and does not interfere with electrical current conduction as in the prior-art arrangements. If only a single nut were used, there would be a greater possibility of its becoming loose on the threads as the gasket became compressed. Since all of the current must pass through the threads from the stud 34 to the nut 39, it is essential that a tight connection be maintained; accordingly, one of the circular nuts, therefore, operates as a lock nut and the spring washer 38 makes further provision against any relative motion between the two nuts 35 and 39 due to vibration or other causes. The space between flexible conductor 28, conducting stud 24, and insulator 30 is filled with a suitable insulating compound 41 after the end 27 of flexible conductor 28 has been soldered into the recess 26 of conducting stud 24.

The insulated bushing assembly 23 must be mounted so as to seal the left-hand opening 20 in the cover 17 of cutout 10 and yet must be mounted so as to cushion any shocks which occur when the fuse interrupts the circuit. Accordingly, the end of insulator 30 extending into the flanged opening 20 of cover 17 is provided with a cushioning material 42 which may comprise a layer of felt or the like which is held in position by means of cord 43 during the assembly process. Insulator 30 is preferably provided with a flange 44 for engaging the flange 21 of cover 17. The bushing assembly 23 is then fastened to the inner portion of the flange 21 by means of bolts 45 and annular ring 46, which latter engages the flange 44. Suitable cushioning gaskets 47 and 48 are provided on either side of flange 44 to prevent injury to the ceramic material. These gaskets may be formed of cork or the like, treated so as to withstand contact with the dielectric, such as oil or one of the halogenated cyclic (aryl) hydrocarbons, such as are described and claimed in United States Letters Patent 1,931,455, granted October 17, 1933, upon an application of F. M. Clark, and assigned to the same assignee as the present application. The space inside of opening 20 between the bushing assembly 23 and the cutout cover 17 is preferably filled with a suitable insulating compound 49. By this arrangement, the bushing assembly 23 is mounted to seal the opening 20 in cover 17 and yet to be resiliently mounted so as to vibrate without damage under the shock due to the explosive pressures generated upon interruption of the circuit within cutout 10.

Since oil-filled cutouts, such as 10, are often used to protect electric-translating apparatus, such as transformers, I have illustrated my invention in Fig. 1 as associated with a transformer, only a portion of the casing 50 of which is shown. The transformer casing is provided with a flanged opening 51 in the sidewall thereof which would ordinarily accommodate the transformer bushing assembly but into which the cutout bushing assembly 23 is inserted and the cutout flange 21 secured directly over the flanged opening 51 by means of bolts 22, Fig. 1. Suitable gasket means, not shown, are used to preclude the escape of dielectric from the transformer casing 50. The bushing assembly 23 extends into the interior of the transformer casing 51 and is electrically connected to one of the transformer winding terminals by means of flexible conductor 40 and cable clamp 52, thereby enabling the bushing assembly 23 to vibrate without damage thereto.

It will be understood that one or both of the terminals of cut out 10 may be constructed as illustrated in detail in Fig. 2. In Fig. 1, both of the terminals of cutout 10 are constructed in this manner and the second terminal 23' preferably extends into a suitable connection box 53 having a suitable flanged opening therein. The flange 21' of the cover 17 of cutout 10 is mounted directly over this flanged opening and secured thereto as by bolts 22' so that the bushing assembly 23' extends into the interior of the metal connection or terminal box 53. Cable connections may be readily completed within this terminal box through an opening provided therein which may be closed by a suitable cover 54 in a manner well understood by those skilled in the art.

It will also be understood by those skilled in the art that only one of the terminals of cutout 10 may be constructed as described above and that the other terminals thereof may be similar to those described and claimed in United States Letters Patent 1,576,102 or 1,740,367, both assigned to the same assignee as the present invention.

Although I have disclosed a single electrical cutout mounted on the tank of an electric-translating apparatus, it will be understood that a plurality of these devices, such as three for example, in the case of a three-phase system, may be bolted to the tank and may be provided with operating means for simultaneously operating the same as disclosed and claimed in United States Letters Patent 1,953,812, granted April 3, 1934, upon an application of G. F. Lincks and Francis L. Flannigan and assigned to the same assignee as the present application.

Although I have disclosed an electrical cutout bushing assembly which is inserted in the bushing opening in a transformer to make electrical connections to the transformer, it should be understood by those skilled in the art that similar advantages might be obtained where the bushing assembly of a transformer is inserted into the terminal opening in a cutout casing and electrical connections made therein. In either arrangement, a considerable reduction in the amount of wiring is obtained with greater compactness, resulting in a simplified and more satisfactory installation.

While I have shown and described a particular embodiment of my invention as applied to electrical apparatus, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In an electric cutout of the oil filled type including a casing having an opening therein, a bushing assembly including a hollow insulator and a conducting stud concentrically mounted with respect to one another, nontamperable means for fastening said insulator to said conducting stud, resilient means for mounting said bushing assembly in said casing opening, and flexible means for electrically connecting said cutout with associated apparatus so that vibration of said bushing assembly under the shock of circuit interruption in said cutout may occur without damage to said insulator.

2. In an electric cutout of the oil filled type including a casing having a flanged opening therein, a bushing assembly including a hollow insulator and a conducting stud concentrically mounted with respect to one another, nontamperable means for fastening said insulator to said conducting stud including a pair of circular nuts, a recess in one of said nuts for accommodating a spring washer so constructed and arranged that said recess is completely hidden upon assembly of said bushing assembly and said spring washer is eliminated from the electrical circuit, resilient means for mounting said bushing assembly in said flanged opening, and flexible means for electrically connecting said cutout with associated apparatus so that vibration of said bushing assembly under the shock of circuit interruption in said cutout may occur without damage to said insulator.

3. In an electric cutout of the oil filled type including a casing having a flanged opening therein, a bushing assembly including a hollow insulator and a conducting stud concentrically mounted with respect to one another, said conducting stud including means adapted to be gripped by a wrench when fastening said conducting stud to said insulator, said last-mentioned means being mounted in the end of said insulator adapted to be mounted adjacent said casing, nontamperable means including a circular nut for said stud, resilient means for mounting said bushing assembly in said flanged opening, and flexible means for electrically connecting said cutout with associated apparatus so that vibration of said bushing assembly under the shock of circuit interruption in said cutout may occur without damage to said insulator.

4. In an electric circuit-interrupting means, a casing having an opening therein, a bushing assembly including a hollow insulator and a conducting stud concentrically mounted with respect to one another, nontamperable means for fastening said insulator to said conducting stud comprising a pair of circular nuts threaded on said conducting stud, a recess in one of said nuts for accommodating a spring washer so constructed and arranged that said recess is completely hidden upon assembly of said bushing assembly and said spring washer is eliminated from the electrical circuit, an electrical conductor electrically connected to one of said nuts, one of said nuts acting as a lock nut to insure good electrical connection between said conducting stud and said electrical conductor, and means including resilient means for mounting said bushing assembly in said opening in said casing.

RALPH S. BENNETT.